United States Patent
H et al.

(10) Patent No.: US 10,620,061 B2
(45) Date of Patent: Apr. 14, 2020

(54) VULCANIZED METAL PLUG FOR HIGH FATIGUE APPLICATION FOR LOAD PIN

(71) Applicant: Honeywell International Inc., Morris Plains, NJ (US)

(72) Inventors: Madhusudhan H, Karnataka (IN); Michael Moran, Plain City, OH (US); Sivaprakash Eswaran, Karnataka (IN); Andrew Kelly, Columbus, OH (US); Sudheer Beligere, Karnataka (IN); Brian Richards, Upper Arlington, OH (US); Vasanth Sivasubramanian, Karnataka (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/357,822

(22) Filed: Nov. 21, 2016

(65) Prior Publication Data

US 2018/0143089 A1    May 24, 2018

(51) Int. Cl.
  *G01L 1/04*   (2006.01)
  *G01L 5/00*   (2006.01)
  *G01L 1/26*   (2006.01)

(52) U.S. Cl.
  CPC .......... *G01L 1/04* (2013.01); *G01L 1/26* (2013.01); *G01L 5/0004* (2013.01)

(58) Field of Classification Search
  CPC ............ G01L 1/04; G01L 1/26; G01L 5/0004
  USPC ....................................................... 73/760
  See application file for complete search history.

(56) References Cited

U.S. PATENT DOCUMENTS

| | | | | |
|---|---|---|---|---|
| 1,058,210 A | * | 4/1913 | Welch | B21D 39/03 138/89 |
| 2,368,181 A | * | 1/1945 | Sergius | G01K 5/44 200/83 B |
| 2,579,845 A | * | 12/1951 | McWherter | F01P 11/20 220/235 |
| 2,665,818 A | * | 1/1954 | Goss | F02B 77/005 220/804 |
| 3,269,582 A | * | 8/1966 | Knocke | F16J 13/00 220/305 |

(Continued)

FOREIGN PATENT DOCUMENTS

| | | | |
|---|---|---|---|
| EP | 0789234 | * | 8/1997 |
| EP | 1286146 A1 | | 2/2003 |

*Primary Examiner* — Octavia Hollington
(74) *Attorney, Agent, or Firm* — Craige Thompson; Thompson Patent Law; Vincent Musgrove (57) ABSTRACT

Embodiments relate generally to systems and methods for providing a seal between an expansion plug and an opening in a load pin. A load pin may comprise a strain gauge located within an opening in a body of the load pin; an expansion plug configured to seal with the opening, covering the strain gauge; and a sealing material attached to at least a portion of the expansion plug configured to seal between the expansion plug and the opening. A method may comprise selecting a sealing material configured to prevent damage to the expansion plug from the external environment, based on the environment in which the expansion plug will be used; applying the sealing material to at least a portion of the expansion plug; vulcanizing the sealing material to the expansion plug to combine the two elements; and inserting the expansion plug into the opening.

14 Claims, 6 Drawing Sheets

(56) References Cited

U.S. PATENT DOCUMENTS

| | | | | |
|---|---|---|---|---|
| 3,448,549 A * | 6/1969 | McCall | ............... | B24B 13/00 |
| | | | | 451/364 |
| 3,695,096 A * | 10/1972 | Kutsay | ............... | G01L 1/2225 |
| | | | | 73/761 |
| 3,929,009 A * | 12/1975 | Lutz | ............... | E21B 47/0006 |
| | | | | 73/862.338 |
| 4,049,151 A * | 9/1977 | Schweiso | ............... | B23P 11/02 |
| | | | | 220/201 |
| 4,165,637 A * | 8/1979 | Kooman | ............... | B63B 21/00 |
| | | | | 73/862.393 |
| 4,359,898 A * | 11/1982 | Tanguy | ............... | G01L 1/22 |
| | | | | 73/152.48 |
| 4,479,489 A * | 10/1984 | Tucci | ............... | A61N 1/3752 |
| | | | | 607/37 |
| 4,815,629 A * | 3/1989 | Tausk | ............... | B65D 39/00 |
| | | | | 220/233 |
| 4,858,475 A * | 8/1989 | Jacobson | ............... | G01L 1/2225 |
| | | | | 73/862.57 |
| 5,056,678 A * | 10/1991 | Grills | ............... | B64D 11/02 |
| | | | | 220/234 |
| 5,456,119 A * | 10/1995 | Nakazaki | ............... | G01G 19/12 |
| | | | | 177/136 |
| 5,546,817 A | 8/1996 | Heiman | | |
| 6,394,139 B1 * | 5/2002 | Mitchell | ............... | F16L 55/10 |
| | | | | 138/89 |
| 6,898,989 B2 | 5/2005 | Norling et al. | | |
| 8,734,261 B1 * | 5/2014 | Line | ............... | F16D 3/06 |
| | | | | 138/89 |

* cited by examiner

VULCANIZED METAL PLUG FOR HIGH FATIGUE APPLICATION FOR LOAD PIN

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In many industrial areas it is necessary to accurately measure the magnitude of a force. Load pins (also known as load cells) may be used in measuring devices installed on equipment in strategic areas to measure forces within the equipment and/or applied to the equipment. Load pins may contain one or more strain gauges having a movable portion, a fixed portion, and a sensor for detecting the movement of the moveable portion.

SUMMARY

In an embodiment, an expansion plug configured to seal with an opening may comprise a concave upper surface; an edge configured to contact the opening; and a sealing material attached to at least one of the concave upper surface and the rounded edge of the expansion plug.

In an embodiment, a load pin may comprise a strain gauge located within an opening in a body of the load pin; an expansion plug configured to seal with the opening, covering the strain gauge; and a sealing material attached to at least a portion of the expansion plug configured to seal between the expansion plug and the opening.

In an embodiment, a method of providing a seal between an expansion plug and an opening may comprise selecting a sealing material configured to prevent damage to the expansion plug from the external environment, based on the environment in which the expansion plug will be used; applying the sealing material to at least the edge surface of the expansion plug, wherein the edge surface is the surface that contacts the opening; vulcanizing the sealing material to the expansion plug to combine the two elements; inserting the expansion plug into the opening, where the sealing material is located between the expansion plug and at least a portion of the opening; and collapsing a concave portion of the expansion plug, thereby sealing the expansion plug with the opening.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure include systems and methods for providing improved sealing between an expansion plug and an opening. In some embodiments, the expansion plug may be inserted into an opening of a load pin. In some embodiments, the expansion plug may be configured to protect a strain gauge located within the load pin.

The load pin may be used to measure tension and/or compression, and may comprise a pocked design, comprising one or more openings within the body of the load pin. A strain gage may be mounted on an external pocket (or within one of the openings) of the load pin. Load pins may be used in many different applications, where the load pins may be subjected to various environmental conditions. To protect the strain gauge, an expansion plug may be inserted into the pocket or opening, covering the strain gauge. The expansion plug may mount within the pocket or opening above the strain gauge. The expansion plug may comprise a concave portion configured to collapse when a force is applied, thereby sealing with the opening.

In some embodiments, the load pin may be subjected to immersion in water, creating the possibility for corrosion and damage to the expansion plug (particularly when the expansion plug comprises a metal material). If the expansion plug is damaged, the protection of the strain gauge may be compromised, allowing environmental elements (such as water, moisture, oil, and dust particles) to impact the performance of the strain gauge and thereby the load pin.

Figure 1A:
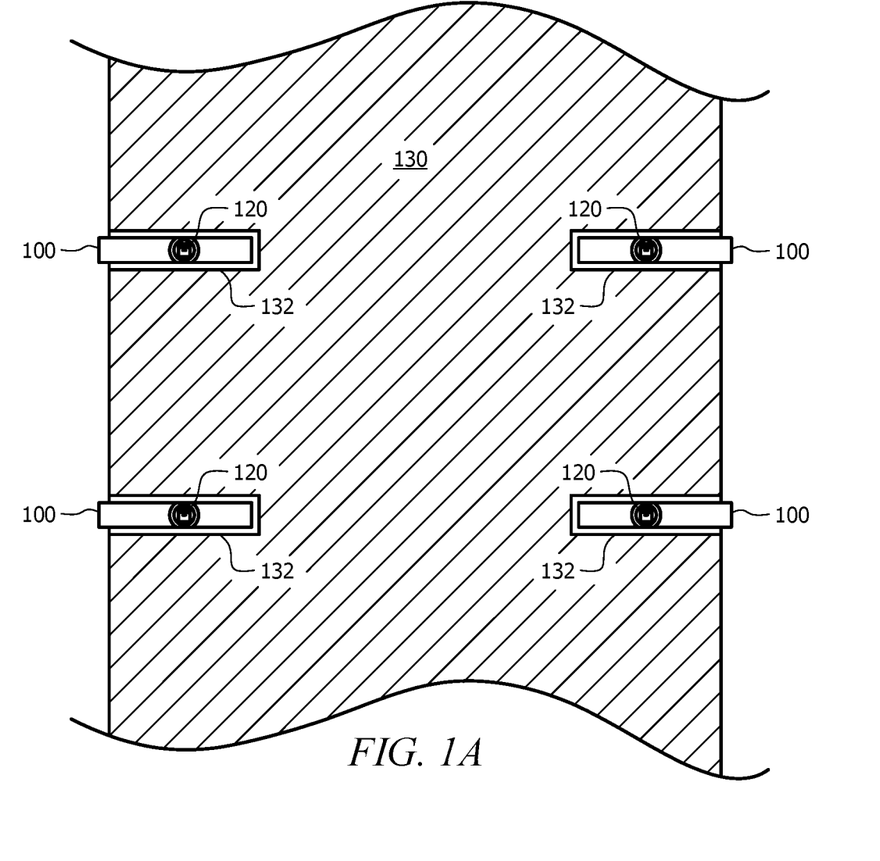
FIG. 1A illustrates a machine comprising one or more load pins according to an embodiment of the disclosure.

Referring to FIG. 1A, load pins 100 may be used to measure loads in various systems. A load pin 100 equipped with one or more strain gauges 120 may be mounted into an opening 132 in a machine 130 in place of a shaft, a bolt, a pivot pin, or clevis pin. The strain gauges 120 may be configured to measure loads in the load pin 100 and to generate a signal proportional to the measured load. This signal may be communicated to a user monitoring the load on the machine 130.

In some embodiments, a load pin 100 may be used to connect two or more parts of the machine 130 together, wherein the opening 132 may be located within the two or more parts. In some embodiments, the load pin 100 may be located within a part of the machine 130 is that expected to experience force, pressure, strain, vibration, or a similar motion or load that may be detected by the strain gauge 120 of the load pin 100.

Figure 1B:
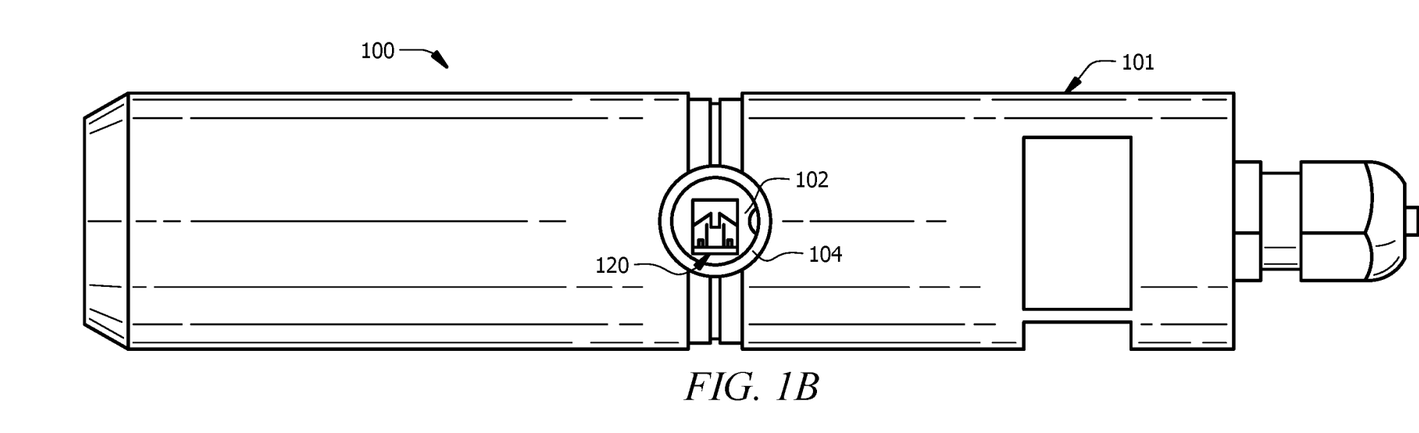
FIGS. 1B-1C illustrate side views of a load pin according to an embodiment of the disclosure.

Referring now to FIG. 1B, an exemplary load pin 100 is shown, comprising a body 101 and at least one opening 102. The load pin 100 may comprise a strain gauge 120 located within the opening 102 of the body 101. In some embodiments, the opening 102 may comprise a ledge 104 within the opening 102. As shown in FIG. 1B, the opening 102 may comprise a rounded shape.

Figure 1C:
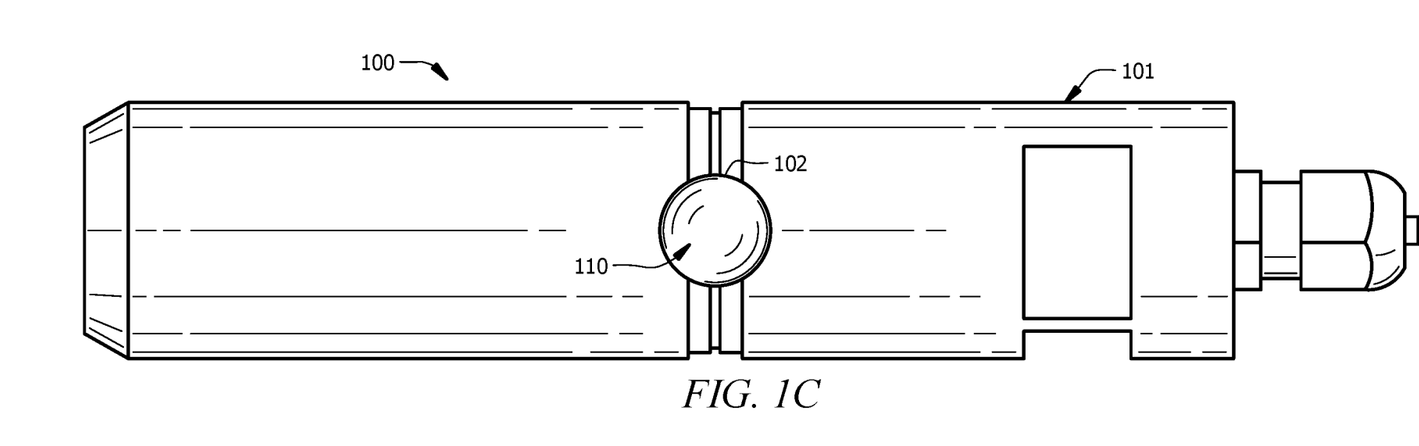

Referring to FIG. 1C, to protect the internal components of the load pin 100, an expansion plug 110 may be inserted into the opening 102 to the load pin 100. The expansion plug 110 may also comprise a rounded shape. In some embodiments, the expansion plug 110 may contact the ledge 104, shown in FIG. 1B.

Figure 2:
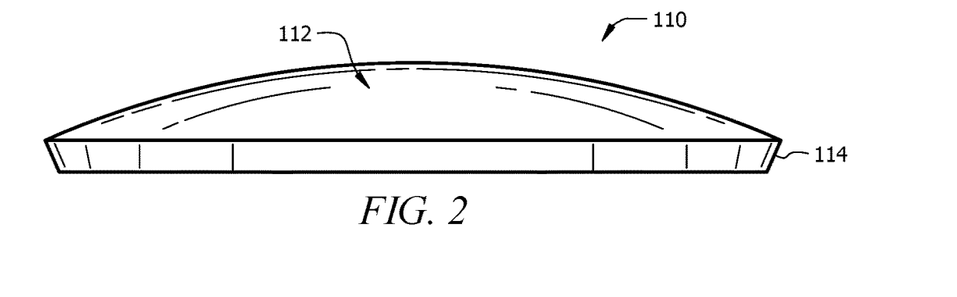
FIG. 2 illustrates a side view of an expansion plug according to an embodiment of the disclosure.

FIG. 2 illustrates a side view of the expansion plug 110. The expansion plug 110 may comprise a concave upper surface 112 and an edge 114. In some embodiments, the expansion plug 110 may comprise stainless steel. In some embodiments, the metal plug 110 may comprise one or more of the following materials: brass, aluminum, steel, cold rolled steel, stainless steel, corrosion resistant alloys, copper bearing metals, and combinations thereof.

The material of the expansion plug 110 may be chosen to be "suitable for vulcanization" to be attached to a sealing material, further described below. In some embodiments, the expansion plug 110 may comprise a Welch plug or a freeze plug.

Figure 3:
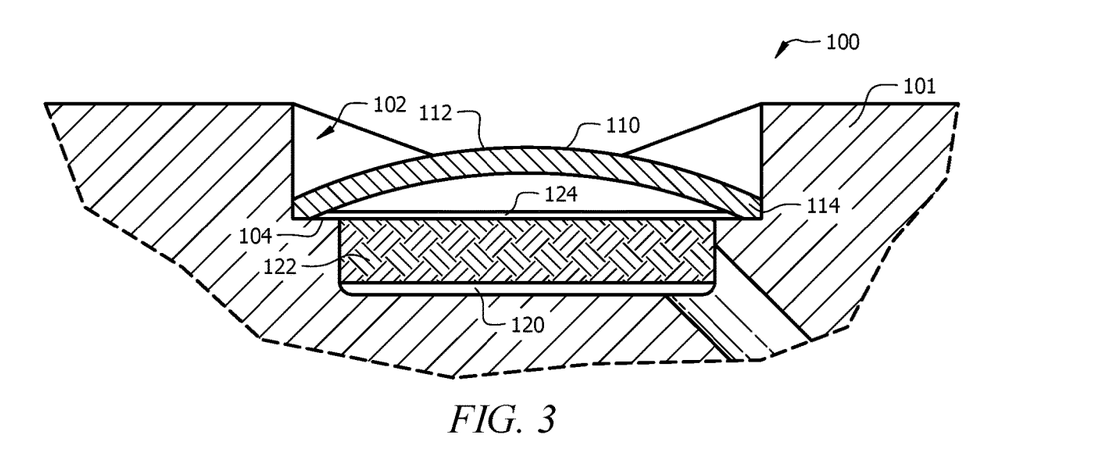
FIG. 3 illustrates a cross-sectional view an expansion plug and load pin according to an embodiment of the disclosure.

FIG. 3 illustrates a cross-sectional view of the expansion plug 110 inserted into the opening 102 of the body 101 of the load pin 100 (as shown in FIG. 1C). The strain gauge 120 may be covered by one or more protective materials 122 (such as a protective coating and/or a potting material). In some embodiments, the strain gauge 120 may comprise wires and/or other elements allowing the strain gauge to communicate information to other parts of the load pin 100.

The edge 114 of the expansion plug 110 may contact the ledge 104 within the opening 102. The ledge 104 may be positioned to separate the expansion plug 110 from the strain gauge 120 and/or other elements of the load pin 100. In the embodiment shown in FIG. 3, the expansion plug 110 may comprise an adhesive material 124 configured to attach the expansion plug 110 to the opening 102. The adhesive material 124 may comprise an epoxy adhesive.

Figure 4A:
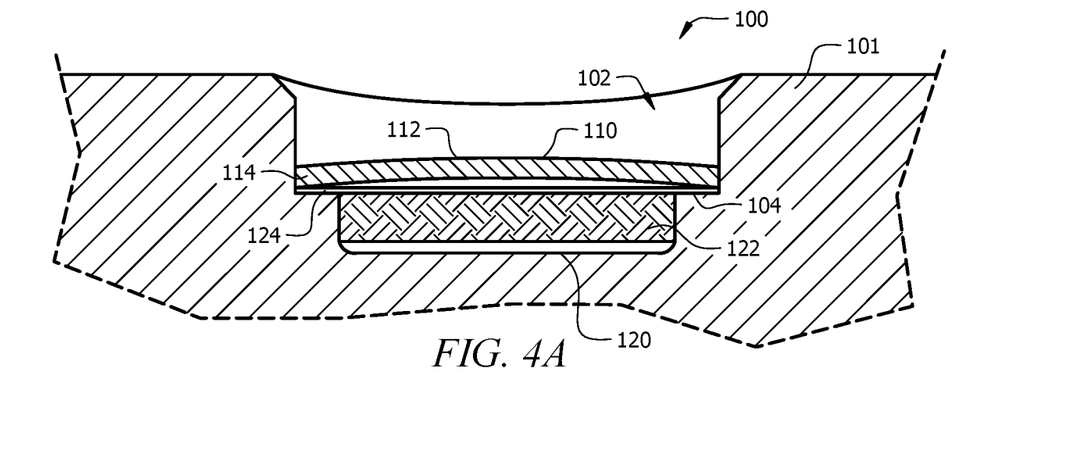
FIGS. 4A-4B illustrates cross-sectional views of an expansion plug inserted into a load pin according to an embodiment of the disclosure.
Figure 4B:
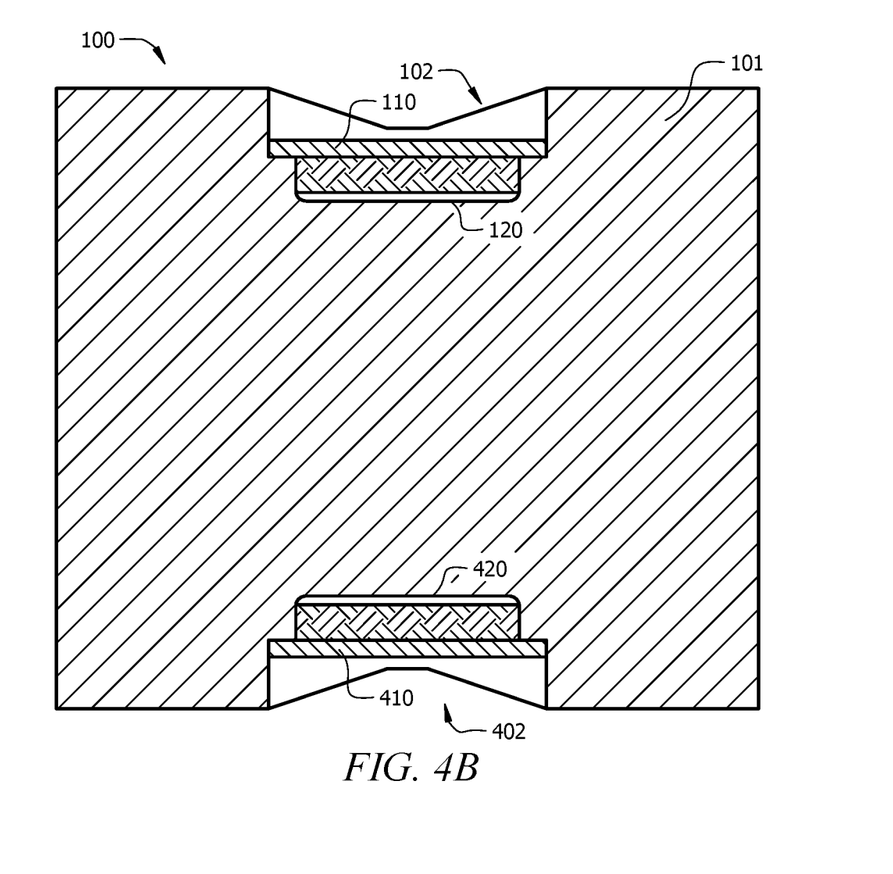

Referring to FIG. 4A, the expansion plug 110 is shown collapsed into the opening 102. In some embodiments, a force may be applied to the concave upper surface 112 of the expansion plug 110, wherein the concave upper surface 112 may be configured to collapse against the ledge 104 of the opening 102, thereby expanding the expansion plug 110 within the opening 102 and sealing the opening 102. FIG. 4B illustrates a load pin 100 comprising multiple openings 102 and 402 and strain gauges 120 and 420, wherein expansion plugs 110 and 410 may be inserted into each of the openings 102 and 402.

In some embodiments of the disclosure, a sealing material may be attached to an expansion plug to provide additional sealing and protection for the internal components of a load pin, as well as for the expansion plug itself.

Figure 5:
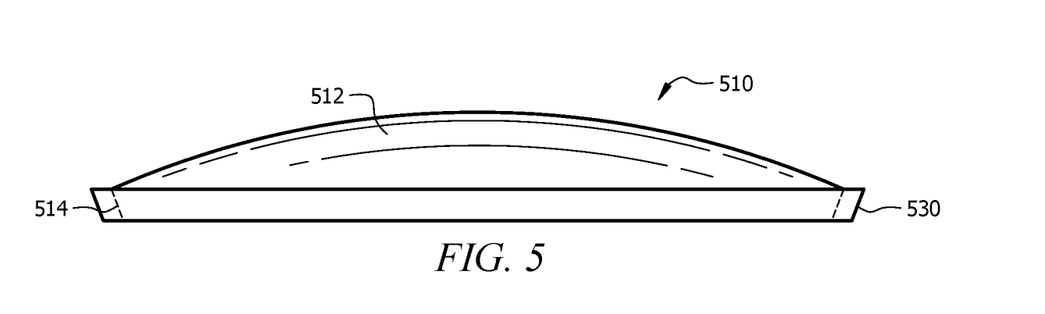
FIG. 5 illustrates a side view of an expansion plug comprising a sealing material according to an embodiment of the disclosure.

For example, as shown in FIG. 5, a layer of sealing material 530 may be attached to the edge 514 of the expansion plug 510, wherein the edge 514 of the expansion plug 510 contacts the walls and/or ledges of an opening when the expansion plug 510 is inserted into the opening. The sealing material 530 may be configured to provide additional sealing between the edge 514 of the expansion plug 510 and an opening. As shown in FIG. 5, the concave upper surface 512 of the expansion plug 510 may be free of the sealing material 530.

Figure 6:
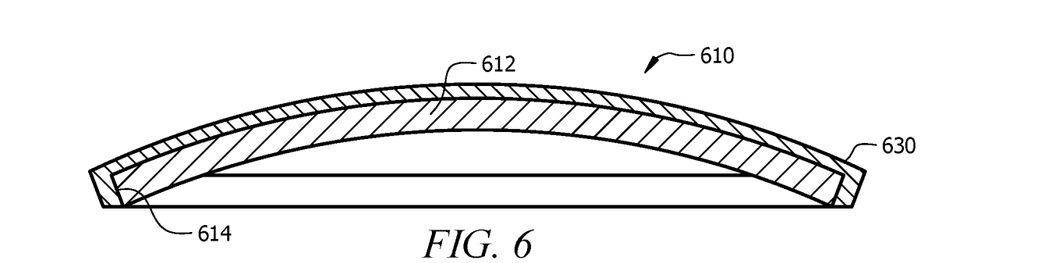
FIG. 6 illustrates a cross-sectional view of an expansion plug comprising a sealing material according to an embodiment of the disclosure.

Referring now to FIG. 6, a cross-sectional view of an expansion plug 610 is shown. In some embodiments, a layer of sealing material 630 may be attached to the concave upper surface 612 as well as the edge 614 of the expansion plug 610. The sealing material 630 may be configured to provide additional sealing between the edge 614 of the expansion plug 610 and an opening. Additionally, the sealing material 630 may be configured to protect the concave upper surface 612 of the expansion plug 610 from corrosion and/or damage caused by the environment (such as water, dust, oil, etc.).

Figure 7:
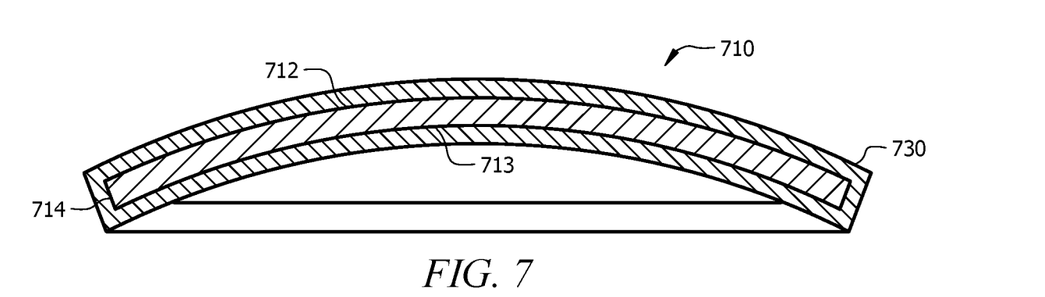
FIG. 7 another cross-sectional view of an expansion plug comprising a sealing material according to an embodiment of the disclosure.

Referring now to FIG. 7, a cross-sectional view of an expansion plug 710 is shown. In some embodiments, a layer of sealing material 730 may be attached to the concave upper surface 712, the edge 714, and an inner surface 713 of the expansion plug 710. In other words, the entire exterior surface of the expansion plug 710 may be covered by the sealing material 730. The sealing material 730 may be configured to provide additional sealing between the edge 714 of the expansion plug 710 and an opening. Additionally, the sealing material 730 may be configured to protect the concave upper surface 712 and the inner surface 713 of the expansion plug 710 from corrosion and/or damage caused by the environment (such as water, dust, oil, etc.).

The sealing material 530, 630, and/or 730 described above may comprise a sealing elastomer material. The material of the sealing material 530, 630, and/or 730 may be chosen based on the environment in which the load pin will be used, and the media that will be sealed out by the sealing material 530, 630, and/or 730. The sealing material 530, 630, and/or 730 may be configured to protect the material of the expansion plug from corrosion and damage. In some embodiments, the sealing material 530, 630, and/or 730 may comprise any material that can be vulcanized to attach the sealing material to the expansion plug. In some embodiments, the sealing material 530, 630, and/or 730 may comprise a moldable rubber. In some embodiments, the sealing material 530, 630, and/or 730 may comprise vulcanized rubber. In some embodiments, the sealing material 530, 630, and/or 730 may comprise one or more of Viton, neoprene, and/or silicone.

Figure 8A:
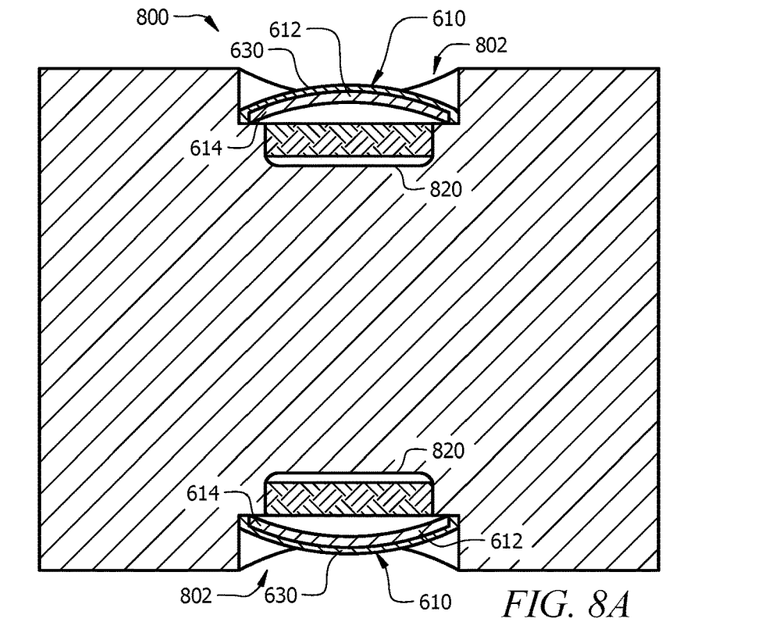
FIGS. 8A-8B illustrate the expansion plug of FIG. 6 inserted into a load pin according to an embodiment of the disclosure.
Figure 8B:
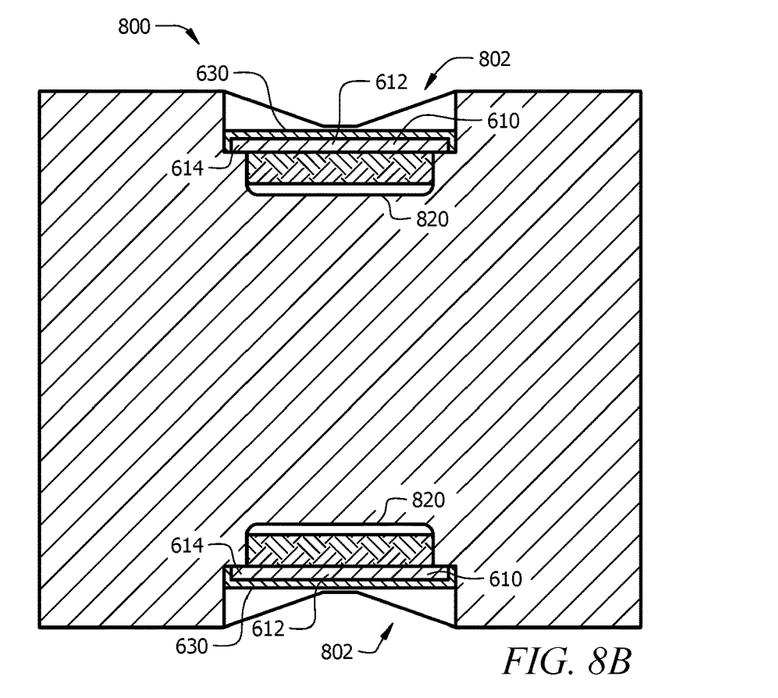

As an example, FIGS. 8A-8B illustrate a load pin 800 comprising the expansion plug 610 (described in FIG. 6). The sealing material 630 may be located between the edge 614 of the expansion plug 610 and the opening 802. The sealing material 630 may also be located on the upper surface 612 of the expansion plug 610. When the expansion plug 610 is inserted into the opening 802, and a force is applied to the concave upper surface 612, the expansion plug 610 may be sealed within the opening 802 covering the strain gauge 820 (as shown in FIG. 8B).

In some embodiments, the load pin 800 may comprise one or more "good spring materials" that could include, but not limited to, AISI 4340, UNS S15500 (15-5), UNS S17400 (17-4) alloys, 17-4 PH Stainless steel, 4140 steel. Additionally, the load pin 800 may comprise an engineering plastic.

In some embodiments, the use of the sealing material 630 may remove the need for an additional adhesive material located between the expansion plug 610 and the opening 802. In some embodiments, the use of a sealing material 630 may allow for wider tolerances on the dimensions of the opening 802. For example, a typical opening 802 for receiving the expansion plug 610 may have a diameter tolerance of approximately ±0.001 inch. Due to the improved sealing between the expansion plug 610 and the opening 802 provided by the sealing material 630, when the expansion plug 610 comprises the sealing material 630, the opening 802 may have a diameter tolerance of approximately ±0.004 inch. The sealing material 630 may also increase the use life of the expansion plug 610, and therefore increase the use life of the overall load pin 800.

The load pin 800 may perform well in water applications due to the sealing material 630, and may qualify for and ingress protection (IP) rating of IP67 and/or IP69 in water resistance. For example, the load pin 800 may be used in underwater or undersea applications. Additionally, the load pin 800 may be able to withstand temperatures up to 85° C., which may be useful in oil and gas industries.

In a first embodiment, an expansion plug configured to seal with an opening may comprise a concave upper surface; an edge configured to contact the opening; and a sealing material attached to at least one of the concave upper surface and the rounded edge of the expansion plug.

A second embodiment can include the expansion plug of the first embodiment, wherein the expansion plug comprises one or more of the following materials: brass, aluminum, steel, cold rolled steel, stainless steel, corrosion resistant alloys, and copper bearing metals.

A third embodiment can include the expansion plug of the first or second embodiments, wherein the expansion plug is configured to cover a strain gauge within a load pin, and wherein the opening is incorporated into the load pin.

A fourth embodiment can include the expansion plug of any of the first to third embodiments, wherein the sealing material comprises vulcanized rubber.

A fifth embodiment can include the expansion plug of any of the first to fourth embodiments, wherein the sealing material comprises one or more of Viton, neoprene, and silicone.

A sixth embodiment can include the expansion plug of any of the first to fifth embodiments, wherein the sealing material is attached to the entire outer surface of the expansion plug.

A seventh embodiment can include the expansion plug of any of the first to sixth embodiments, wherein the sealing material seals with the opening when the expansion plug is inserted into the opening.

An eighth embodiment can include the expansion plug of any of the first to seventh embodiments, wherein the sealing material is configured to protect the material of the expansion plug from corrosion and damage.

A ninth embodiment can include the expansion plug of any of the first to eighth embodiments, wherein the concave upper surface is configured to collapse when the expansion plug is inserted into the opening.

In a tenth embodiment, a load pin may comprise a strain gauge located within an opening in a body of the load pin; an expansion plug configured to seal with the opening, covering the strain gauge; and a sealing material attached to at least a portion of the expansion plug configured to seal between the expansion plug and the opening.

An eleventh embodiment can include the load pin of the tenth embodiment, wherein the sealing material is attached to the entire outer surface of the expansion plug.

A twelfth embodiment can include the load pin of the tenth or eleventh embodiments, wherein the sealing material is attached to the top surface of the expansion plug.

A thirteenth embodiment can include the load pin of any of the tenth to twelfth embodiment, wherein the sealing material is attached to the edge of the expansion plug, where the edge of the expansion plug contacts the opening in the body of the load pin.

A fourteenth embodiment can include the load pin of any of the tenth to thirteenth embodiments, wherein the expansion plug comprises a metal material.

A fifteenth embodiment can include the load pin of the any of the tenth to fourteenth embodiments, wherein the expansion plug comprises one or more of the following materials: brass, aluminum, steel, cold rolled steel, stainless steel, corrosion resistant alloys, and copper bearing metals.

A sixteenth embodiment can include the load pin of any of the tenth to fifteenth embodiments, wherein the sealing material comprises vulcanized rubber.

A seventeenth embodiment can include the load pin of any of the tenth to fifteenth embodiments, wherein the sealing material comprises a sealing elastomer.

An eighteenth embodiment can include the load pin of any of the twelfth to seventeenth embodiments, wherein the sealing material comprises one or more of Viton, neoprene, and silicone.

In a nineteenth embodiment, a method of providing a seal between an expansion plug and an opening may comprise selecting a sealing material configured to prevent damage to the expansion plug from the external environment, based on the environment in which the expansion plug will be used; applying the sealing material to at least the edge surface of the expansion plug, wherein the edge surface is the surface that contacts the opening; vulcanizing the sealing material to the expansion plug to combine the two elements; inserting the expansion plug into the opening, where the sealing material is located between the expansion plug and at least a portion of the opening; and collapsing a concave portion of the expansion plug, thereby sealing the expansion plug with the opening.

A twentieth embodiment can include the method of the nineteenth embodiment, further comprising applying the sealing material to the entire outer surfaces of the expansion plug.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A load pin comprising:
   a strain gauge located within an opening in a body of the load pin;
   an expansion plug having a collapsible concave portion such that the expansion plug is configured to seal with the opening, covering the strain gauge; and
   a sealing material attached to an entire outer surface of the expansion plug and a circumferential side edge of the expansion plug, wherein the sealing material is configured to seal between the expansion plug and the opening, and wherein the sealing material is vulcanized to the expansion plug.

2. The load pin of claim 1, wherein the sealing material is attached to a top surface of the expansion plug.

3. The load pin of claim 1, wherein the sealing material is attached to an edge of the expansion plug, where the edge of the expansion plug contacts the opening in the body of the load pin.

4. The load pin of claim 1, wherein the expansion plug comprises a metal material.

5. The load pin of claim 1, wherein the expansion plug comprises one or more of the following materials: brass, aluminum, steel, cold rolled steel, stainless steel, corrosion resistant alloys, and copper bearing metals.

6. The load pin of claim 1, wherein the sealing material comprises vulcanized rubber.

7. The load pin of claim 1, wherein the sealing material comprises a sealing elastomer.

8. The load pin of claim 1, wherein the sealing material comprises one or more of Viton, neoprene, and silicone.

9. A load pin assembly comprising:
   a body;
   a first cavity in the body having a first diameter;
   a second cavity in the body having a second diameter smaller than the first diameter, wherein the second cavity is a sub-cavity of the first cavity such that the first and second cavity cooperatively define an annular ledge;
   an expansion plug having a collapsible concave portion such that when the expansion plug is collapsed in the first cavity, the expansion plug forms a seal with the annular ledge to sealingly cover the second cavity; and
   a sealing material attached to each of an entire outer surface of the expansion plug and a circumferential side edge of the expansion plug, wherein the sealing material is configured to seal the expansion plug and the second cavity, wherein the sealing material comprises at least one or more of a vulcanized rubber, elastomer, viton, neoprene and silicone, and wherein the sealing material is vulcanized to the expansion plug.

10. The load pin assembly of claim 9, wherein when the expansion plug is inserted into, and collapsed in, the first cavity, the sealing material forms a seal with an inner wall of the first cavity.

11. The load pin assembly of claim 9, wherein when the expansion plug is collapsed in the first cavity, the expansion plug transitions to a substantially flat, planar structure.

12. The load pin assembly of claim 9, wherein when the expansion plug is inserted into, and collapsed in, the first cavity, a peripheral side edge of the expansion plug forms a seal with an inner wall of the first cavity.

13. The load pin assembly of claim 9, wherein the expansion plug is configured to collapse the concave collapsible portion in response to an insertion force on a top surface of the concave collapsible portion, the insertion force being directed through the first cavity and toward the second cavity.

14. The load pin assembly of claim 9, wherein the sealing material is attached to an inner surface of the expansion plug.

\* \* \* \* \*